United States Patent [19]

Ishino et al.

[11] 4,118,704

[45] Oct. 3, 1978

[54] ELECTROMAGNETIC WAVE-ABSORBING WALL

[75] Inventors: Ken Ishino, Nagareyama; Hiroshi Yamashita, Ichikawa; Nobuyuki Ono, Chiba; Yasuo Hashimoto, Ichikawa, all of Japan

[73] Assignee: TDK Electronics Co., Ltd., Tokyo, Japan

[21] Appl. No.: 782,779

[22] Filed: Mar. 30, 1977

[30] Foreign Application Priority Data

| | | | |
|---|---|---|---|
| Apr. 7, 1976 | [JP] | Japan | 51-39070 |
| Jul. 20, 1976 | [JP] | Japan | 51-86241 |
| Jul. 21, 1976 | [JP] | Japan | 51-97104[U] |

[51] Int. Cl.² .......... G01S 7/36; E04B 1/82; B32B 3/14

[52] U.S. Cl. .......... 343/18 A; 428/47; 428/48; 428/49; 52/144

[58] Field of Search .......... 343/18 A; 428/44, 47, 428/48, 49; 52/144, 145

[56] References Cited

U.S. PATENT DOCUMENTS

| | | | |
|---|---|---|---|
| 3,720,951 | 3/1973 | Naito | 343/18 A |
| 3,737,903 | 6/1973 | Suetake et al. | 343/18 A |
| 3,887,920 | 6/1975 | Wright et al. | 343/18 A |
| 4,003,840 | 1/1977 | Ishino et al. | 343/18 A |
| 4,023,174 | 5/1977 | Wright | 343/18 A |

FOREIGN PATENT DOCUMENTS

| | | | |
|---|---|---|---|
| 814,310 | 6/1959 | United Kingdom | 343/18 A |

*Primary Examiner*—William R. Dixon, Jr.

*Attorney, Agent, or Firm*—Burgess, Ryan and Wayne

[57] ABSTRACT

Electromagnetic wave-absorbing wall comprising ferrimagnetic plates arranged at some intervals in the direction of the electric field of the electromagnetic wave said ferrimagnetic plates being plates of ferrite having the following general formula:

$$MFe_2O_4$$

wherein M is a bivalent metal such as Mn, Ni, Co, Mg, Cu, Zn and Cd, or plates of a mixture of ferrite powders or carbonyl iron with organic high molecular weight compounds, and said plates having a specified thickness according to the interval.

9 Claims, 11 Drawing Figures

(a)

(b)

(c)

(d)

ELECTROMAGNETIC WAVE-ABSORBING WALL

BACKGROUND OF THE INVENTION

It is well known that an electromagnetic wave (or a radio wave, hereinafter referred to as a wave) such as VHF (very high frequency) or UHF (ultra high frequency) is reflected by a wall of building or steel tower and the reflected wave has an especially bad effect on TV reception.

In order to prevent the reflection of the wave, there is provided a wave-absorbing wall shown in FIG. 1, comprising a ferrite plate 1 fixed on a metal plate 2. The ferrite plates are plates of ferrites having the general formula $MFe_2O_4$ (wherein M is a bivalent metal such as Mn, Ni, Co, Mg, Cu, Zn and Cd) and a size of 10cm × 10cm × 1cm. Such ferrite plates are closely fixed on a metallic plate.

The inventors have found that, in such a wave-absorbing wall, the same effect as that obtained in the wave-absorbing wall as shown in FIG. 1 can be obtained even when the ferrite plates are arranged at some intervals, if the ferrite plates having a particular thickness according to the interval are arranged in the direction of the electric field of the wave. The present invention is based on this discovery.

DESCRIPTION OF THE INVENTION

The present invention relates to an electromagnetic wave-absorbing wall or a wall for absorbing a wave of VHF or UHF.

The wave-absorbing wall comprises ferrimagnetic plates arranged at some intervals in the direction of the electric field of the waves, said ferrimagnetic plates being plates of ferrite having the general formula:

$$MFe_2O_4$$

wherein M is a bivalent metal such as Mn, Ni, Co, Mg, Cu, Zn and Cd.

The ferrite plate have a size such as 10cm × 15cm and the specified thickness.

The ferrite plate to be used in the present invention, was prepared as follows:

754g of $Fe_2O_3$, 118g of NiO and 128g of ZnO were each weighed out to provide a Ni-Zn-ferrite including 60 mol% of $Fe_2O_3$, 20 mol% of NiO and 20 mol% of ZnO. The $Fe_2O_3$, NiO and ZnO were mixed in a ball mill for 20 hours. The mixture was compression molded at about 1 ton/cm$^2$ to form a shaped body of plate form. The shaped body was heated at a temperature of 1200° C. for 2 hours. The resulting sintered body is a Ni-Zn-ferrite plate.

The explanation of the present invention is given in the following paragraphs in conjunction with the accompanying drawings.

Figure 1:
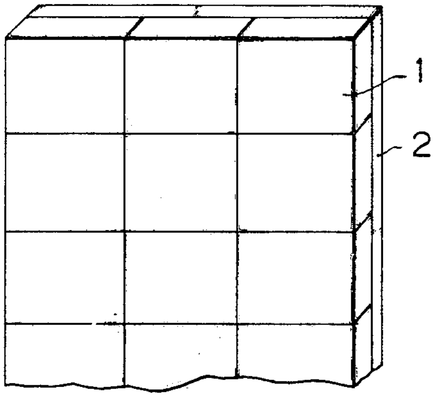
FIG. 1 PRIOR ART
FIG. 1 shows an electromagnetic wave absorbing wall according to the prior art.
Figure 2:
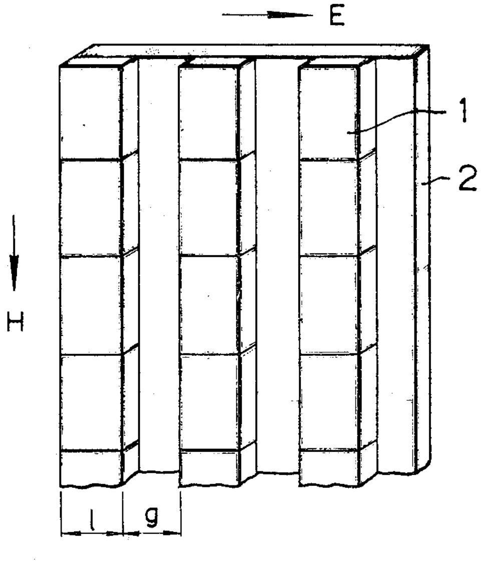
FIG. 2 shows an electromagnetic wave absorbing wall according to a first embodiment of the present invention.

As shown in FIG. 2, the ferrite plates 1 are arranged on an electroconductive material such as metallic plate 2 at some intervals in the direction of the electric field (E) of the wave and closely in the direction of the magnetic field (H) of the waves. A rate of the interval is represented by $g/(l+g) \times 100\%$, wherein $l$ is a width of the ferrite plate and $g$ is the interval between the ferrite plates in the direction of the electric field (E) of the wave.

Figure 3:
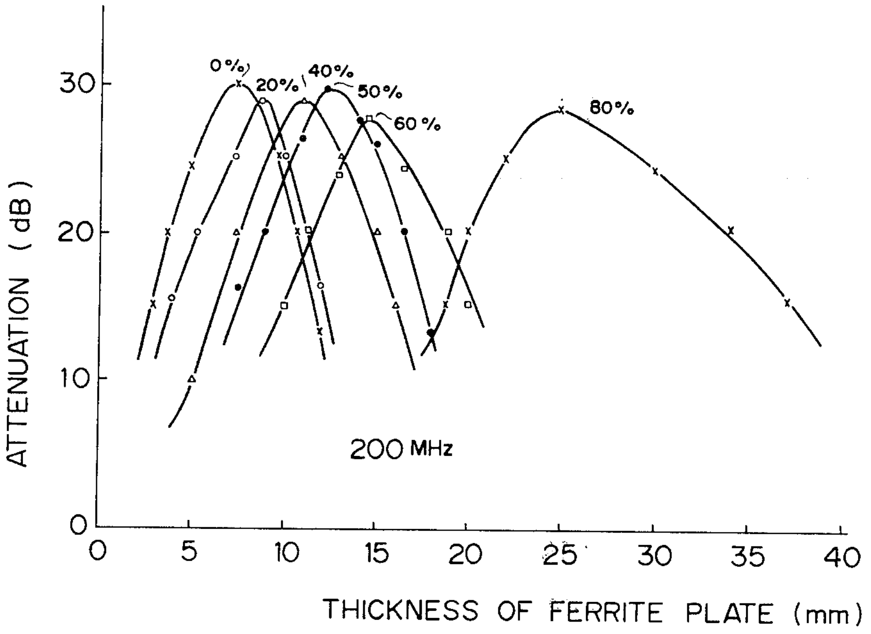
FIGS. 3 and 4 are graphs shown the variation of attenuation of an impinging electromagnetic wave on the wave absorbing wall of FIG. 2.
Figure 4:
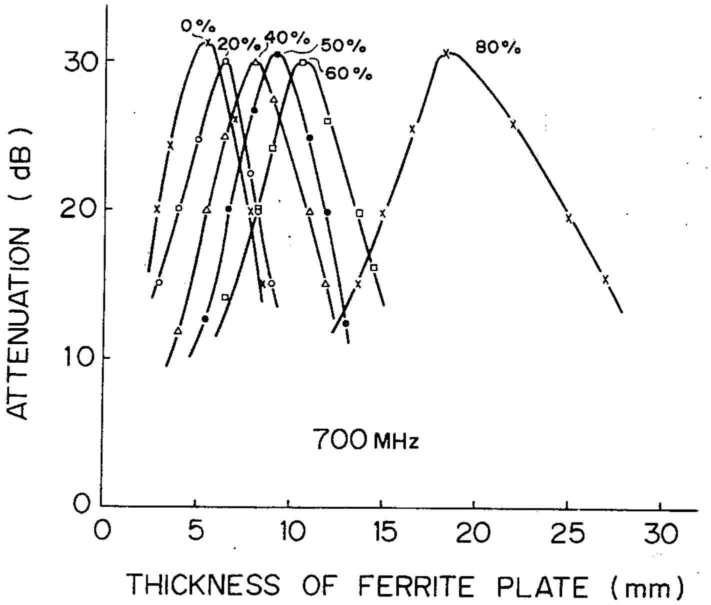

FIG. 3 and FIG. 4 are graphs depicting the variation of attenuation of the wave by reflection on the wall having ferrite plates arranged on the metal plate in the different rates of inverval (0, 20, 40, 50, 60 and 80%) against the thickness of the ferrite plate in the waves of 200 MHz and 700 MHz, respectively.

From the graphs in FIGS. 3 and 4, the thickness of the ferrite plate obtaining maximum attenuation can be determined in 200 MHz and 700 MHz, respectively. The values are shown in Table-1 below:

Table 1

| Rate of interval (%) | Thickness of ferrite plate obtaining maximum attenuation in 200 MHz | Thickness of ferrite plate obtaining maximum attenuation in 700 MHz |
|---|---|---|
| 0 | about 7.5mm | 5.8mm |
| 20 | about 9mm | 6.5mm |
| 40 | about 11mm | 8mm |
| 50 | about 12.5mm | 9.5mm |
| 60 | about 14.5mm | 10.5mm |
| 80 | about 25mm | 18.5mm |

Figure 5:
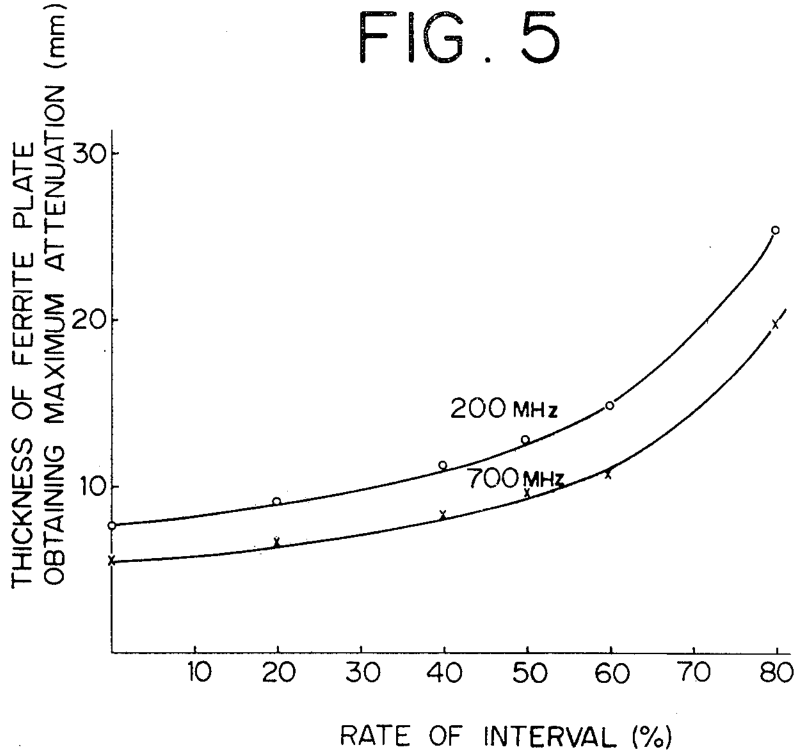
FIGS 5, 6 and 7 are graphs showing parameters of the wall shown in FIG. 2 as a function of the rate of the interval between ferrite plates thereof.

Graphs as shown in FIG. 5 can be obtained by depicting the values as shown in Table-1.

The most suitable thickness of the ferrite plate at no interval is 7.5mm in 200 MHz and 5.5mm in 700 MHz.

The thickness of the ferrite plate obtaining the maximum attenuation at no interval is represented by $d_o$, and the thickness of the ferrite plate obtaining maximum attenuation at some intervals is represented by $d$. The relationship between $d_o$ and $d$ at some intervals ($d = xd_o$) can be derived as shown in Table-2 below:

Table-2

| Rate interval (%) | in 200 MHz | in 700 MHz |
|---|---|---|
| 0 | $d_o = 7.5mm$ | $d_o = 5.5mm$ |
| 20 | $d = \frac{9}{7.5} d_o \approx 1.2d_o$ | $d = \frac{6.5}{5.5} d_o \approx 1.2d_o$ |
| 40 | $d = \frac{11}{7.5} d_o \approx 1.5d_o$ | $d = \frac{8}{5.5} d_o \approx 1.5d_o$ |
| 50 | $d = \frac{12.5}{7.5} d_o \approx 1.7d_o$ | $d = \frac{9.5}{5.5} d_o \approx 1.7d_o$ |
| 60 | $d = \frac{14.5}{7.5} d_o \approx 1.9d_o$ | $d = \frac{10.5}{6.5} d_o \approx 1.9d_o$ |
| 80 | $d = \frac{25}{7.5} d_o \approx 3.4d_o$ | $d = \frac{18.5}{5.5} d_o \approx 3.4d_o$ |

In $d = xd_o$, $x$ takes the similar values at a certain interval irrespective of the frequency of the wave.

Figure 6:
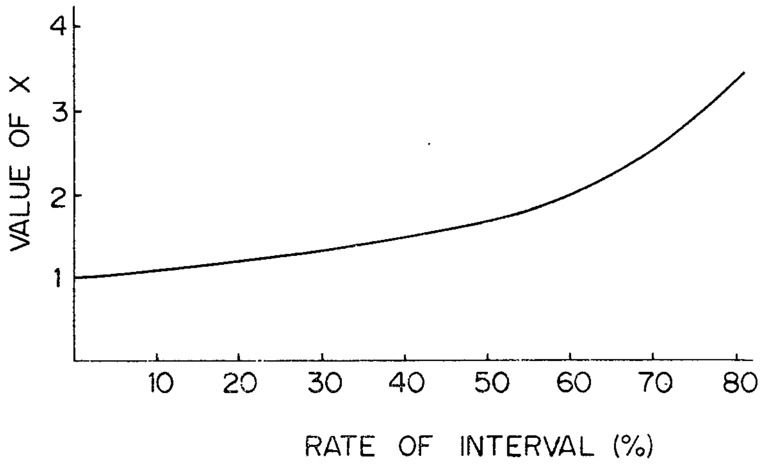

Graph as shown in FIG. 6 can be obtained by depicting the values of $x$ at different intervals.

From the graphs in FIGS. 3, 4 and 6, it can be seen that when the thickness ($d$) of the ferrite plate is determined as shown in Table-3 below, the attenuation of the wave by reflection in a wave-absorbing wall having the ferrite plates arranged at a certain interval in the direction of the electric field (E) of the wave is equivalent to the maximum attenuation (about 30 dB) of the wave in the wave-absorbing wall having the ferrite plates arranged at no interval.

Table 3

| Rate of interval (%) | Thickness of ferrite plate arranged at some intervals (d) |
|---|---|
| 10 | $1.1d_o$ |
| 20 | $1.15d_o$ |
| 30 | $1.25d_o$ |
| 40 | $1.5d_o$ |
| 50 | $1.7d_o$ |
| 60 | $1.9d_o$ |
| 70 | $2.5d_o$ |
| 80 | $3.4d_o$ |

However, on referring to the graphs in FIGS. 3 and 4, the attenuation of more than 20 dB can be obtained in the range of the thickness of the ferrite plates as shown in Table-4 below:

Table 4

| Rate of interval | Thickness of ferrite plate for obtaining the attenuation of more than 20 dB | |
|---|---|---|
| (%) | in 200 MHz | in 700 MHz |
| 0 | (8.7 mm ~ 10.7mm) | (8mm ~ 8mm) |
| 20 | 63mm ~ 11.3mm | 4mm ~ 8.5mm |
| 40 | 7.5mm ~ 15mm | 6.5mm ~ 11mm |
| 50 | 9mm ~ 16.5mm | 6.5mm ~ 12mm |
| 60 | 11.8mm ~ 18.8mm | 8mm ~ 14mm |
| 80 | 20mm ~ 34mm | 15mm ~ 25mm |

The relationship between $d_o$ and $d$ for obtaining the attenuation of more than 20 dB at some intervals ($d = x_1d_o \sim x_1d_o$) can be derived from the values as shown in Table-4. The relationship is shown in Table-5 below:

Table-5

| Rate of interval (%) | in 200 MHz | in 700 MHz |
|---|---|---|
| 0 | ($d_o$ = 7.5mm) | ($d_o$ = 5.5mm) |
| 20 | $d = \frac{5.3}{7.5} d_o \sim \frac{11.3}{7.5} d_o \approx 0.7d_o \sim 1.5d_o$ | $d = \frac{4}{5.5} d_o \sim \frac{8.5}{5.5} d_o \approx 0.7d_o \sim 1.5d_o$ |
| 40 | $d = \frac{7.5}{7.5} d_o \sim \frac{15}{7.5} d_o \approx 1.0d_o \sim 2.0d_o$ | $d = \frac{5.5}{5.5} d_o \sim \frac{11}{5.5} d_o \approx 1.0d_o \sim 2.0d_o$ |
| 50 | $d = \frac{9}{7.5} d_o \sim \frac{16.5}{7.5} d_o \approx 1.2d_o \sim 2.2d_o$ | $d = \frac{6.5}{5.5} d_o \sim \frac{12}{5.5} d_o \approx 1.2d_o \sim 2.2d_o$ |
| 60 | $d = \frac{11.3}{7.5} d_o \sim \frac{18.8}{7.5} d_o \approx 1.5d_o \sim 2.5d_o$ | $d = \frac{8}{5.5} d_o \sim \frac{14}{5.5} d_o \approx 1.5d_o \sim 2.5d_o$ |
| 80 | $d = \frac{20}{7.5} d_o \sim \frac{34}{7.5} d_o \approx 2.7d_o \sim 4.5d_o$ | $d = \frac{15}{5.5} d_o \sim \frac{26}{5.5} d_o \approx 2.7d_o \sim 4.5d_o$ |

Figure 7:
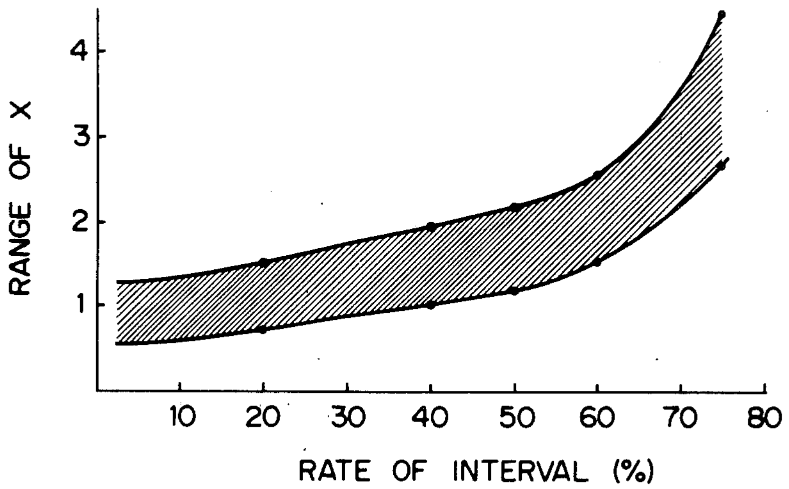

Graph as shown in FIG. 7 can be obtained by depicting the values in Table-5.

In a wave-absorbing wall comprising ferrite plates arranged at some intervals, the attenuation of wave of more than 20 dB can be obtained by specifying the thickness ($d$) of the ferrite plates as shown below:

| Rate of interval (%) | Thickness of ferrite plate (d) |
|---|---|
| < 20% | $0.5d_o \sim 1.5d_o$ |
| 20% ~ 40% | $0.7d_o \sim 2.0d_o$ |
| 40% ~ 60% | $1.0d_o \sim 2.5d_o$ |
| 60% ~ 80% | $1.5d_o \sim 4.5d_o$ |

In the wave-absorbing wall as above, the arrangement of the ferrite plates in the interval rate of from 10 to 60% is useful, because the ferrite plates of large thickness are required in the interval rate of more than 60%.

Figure 8:
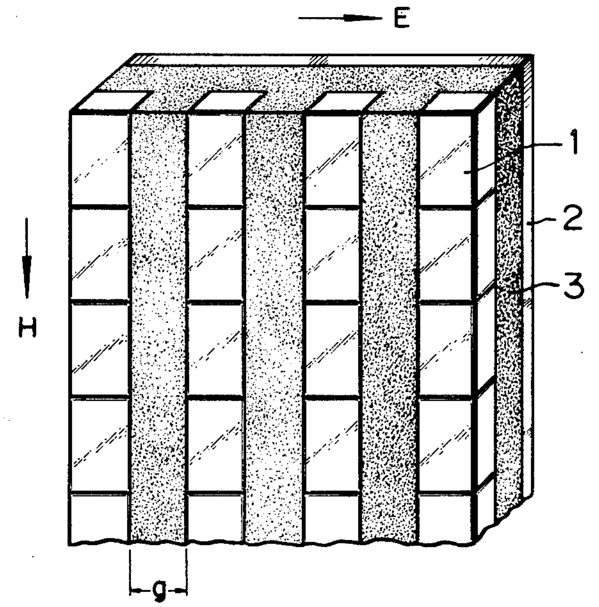
FIGS. 8, 9 and 10 shown electromagnetic wave absorbing walls according to alternative embodiments of the invention.
Figure 9:
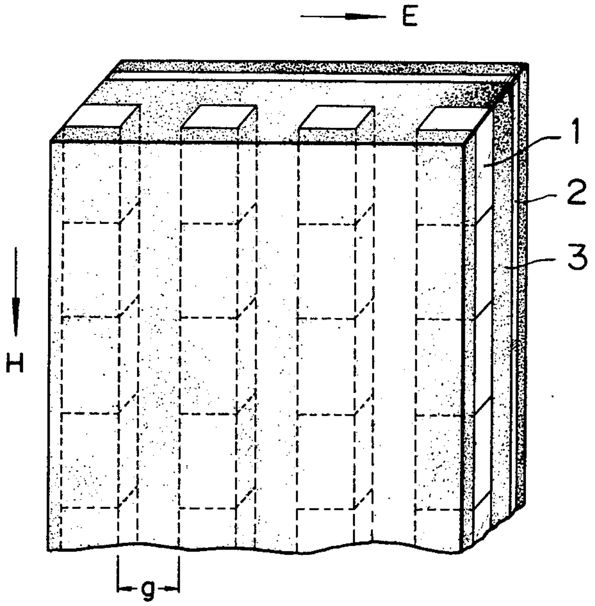

In other embodiments of the wave-absorbing wall of the present invention, as shown in FIG. 8 and FIG. 9, the ferrite plates 1 may be embedded in a cement mortar 3. In this case, an electroconductive material such as a metallic plate or net 2 should be contained in the cement mortar 3.

Figure 10:
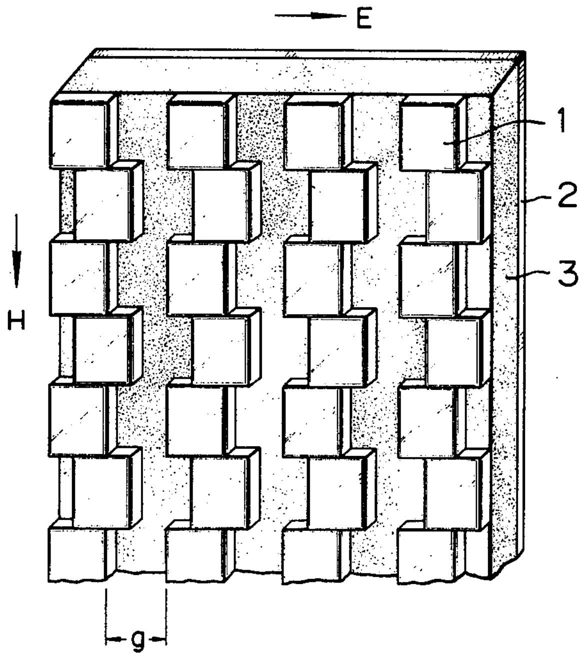

Further, as shown in FIG. 10, the wave-absorbing wall may be formed by arranging the ferrite plates 1 with sliding alternate ones on a cement mortar 3 containing a metallic plate or net 2.

Figure 11:
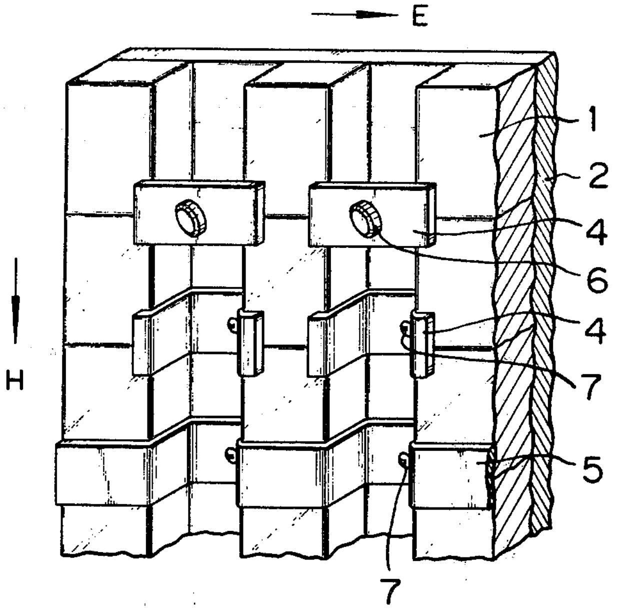
FIG. 11 shows various attaching means for the ferrite plates.
Figure 11:
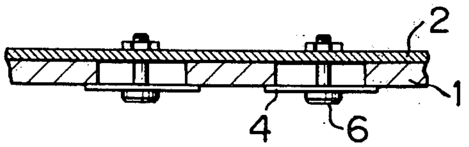
Figure 11:
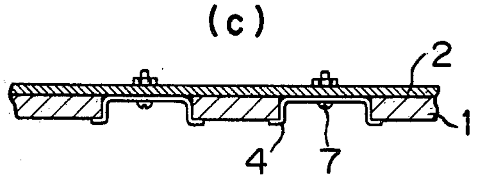
Figure 11:
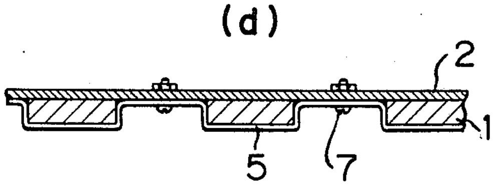

As shown in FIG. 11(*a*), (*b*), (*c*) and (*d*), the ferrite plates 1 may be fixed to the metallic base plate 2 by fastening a metallic plate 4 or a plastic plate 5 to the metallic base plate 1 with a bolt 6 or a screw 7.

Other ferrimagnetic plates may be used instead of the ferrite plate. Such other ferrimagnetic plate can be prepared by mixing 2 to 9 parts by volume of ferrite powders or carbonyl iron with 8 to 1 parts by volume of insulating organic high molecular weight compounds such a synethic rubbers, thermoplastic resins and thermosetting resins as shown below: Synthetic rubber such as polychloroprene, acrylonitrilebutadiene-styrene and fluorine-contained rubber; thermoplastic resins such as polyethylene, polypropylene and polyvinyl chloride; thermosetting resins such as resin, polyester resin, epoxy resin and silicone resin.

We claim:

1. An electromagnetic wave-absorbing wall comprising an array of ferrimagnetic plates affixed by one face to the surface of an electroconductive substrate arranged at spaced-apart intervals in the direction of the electric field of the electromagnetic wave and closely in the direction of the magnetic field thereof, in which the rate of interval and the thickness of ferrimagnetic plates are arranged according to the following relationship:

| Rate of Interval ($\frac{g}{l+g} \times 100\%$) | Thickness of ferrimagnetic plate (d) |
|---|---|
| <20% | $0.5d_o \sim 1.5d_o$ |
| 20% ~ 40% | $0.7d_o \sim 2.0d_o$ |
| 40% ~ 60% | $1.0d_0 \sim 2.5d_o$ |
| 60% ~ 80% | $1.5d_o \sim 4.5d_o$ |

wherein "$l$" is the width of the ferrimagnetic plate, "$g$" is the interval between the ferrimagnetic plates, "$d_o$" is the thickness of ferrimagnetic plate which would result in maximum attenuation at no interval between plates, and "*d*" is the thickness of the ferrimagnetic plate at said interval.

2. An electromagnetic wave-absorbing wall according to claim 1, said ferrimagnetic plate being a plate of a ferrites having the general formula:

$$MFe_2O_4$$

wherein M is bivalent metal such as Mn, Ni, Co, Mg, Cu, Zn and Cd.

3. An electromagnetic wave-absorbing wall according to claim 1 wherein said ferrimagnetic plate is a plate of a mixture of ferrite powders with an insulating organic high molecular weight compound.

4. An electromagnetic wave-absorbing wall according to claim 3 wherein said insulating organic high molecular weight compound is selected from the group consisting of synthetic rubber, thermoplastic resin and thermosetting resin.

5. An electromagnetic wave-absorbing wall according to claim 1 wherein said ferrimagnetic plate is a plate of a mixture of carbonyl iron with an insulating organic high molecular weight compound.

6. An electromagnetic wave-absorbing wall according to claim 5 wherein said insulating organic high molecular compound is selected from the group consisting of synthetic rubber, thermoplastic resin and thermosetting resin.

7. An electromagnetic wave-absorbing wall according to claim 1 wherein said ferrimagnetic plates are affixed directly to said substrate.

8. An electromagnetic wave-absorbing wall according to claim 1 wherein said ferrimagnetic plates are arrayed in uniform columns in the direction of said magnetic field.

9. An electromagnetic wave-absorbing wall according to claim 1 wherein said ferrimagnetic plates are arrayed in partially staggered rows in the direction of said magnetic field.

* * * * *

UNITED STATES PATENT OFFICE

CERTIFICATE OF CORRECTION

Patent No. 4,118,704 Dated October 3, 1978

Inventor(s) Ken Ishino, et al

It is certified that error appears in the above-identified patent and that said Letters Patent are hereby corrected as shown below:

Column 2, Table 1, the third column, line 1: "5.8mm" should be --5.5mm--.

Column 2, line 58 (Table 2, 3rd column): "$d = \frac{10.5}{6.5}$" should be -- $d = \frac{10.5}{5.5}$ --.

Column 3, line 29 (Table 4, 3rd column): "6.5mm∼11mm" should be --5.5mm∼11mm--.

Signed and Sealed this

*Twenty-fourth* Day of *April 1979*

[SEAL]

*Attest:*

RUTH C. MASON
*Attesting Officer*

DONALD W. BANNER
*Commissioner of Patents and Trademarks*